(12) United States Patent  
Schreter

(10) Patent No.: US 10,754,562 B2  
(45) Date of Patent: Aug. 25, 2020

(54) KEY VALUE BASED BLOCK DEVICE

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 16/029,453

(22) Filed: Jul. 6, 2018

(65) Prior Publication Data

US 2019/0012085 A1   Jan. 10, 2019

Related U.S. Application Data

(60) Provisional application No. 62/530,075, filed on Jul. 7, 2017.

(51) Int. Cl.
*G06F 3/06* (2006.01)
*G06F 17/30* (2006.01)
(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01);
(Continued)

(58) Field of Classification Search
CPC ............. G06F 3/0631; G06F 16/24552; G06F 3/0644; G06F 12/0802; G06F 16/162; G06F 16/1824; G06F 16/176; G06F 16/134; G06F 3/0611; G06F 3/064; G06F 3/0659; G06F 12/1009; G06F 16/951; G06F 16/27; G06F 16/2358; G06F 11/1658; G06F 16/245; G06F 16/215; G06F 3/0608; G06F 3/0652; G06F 3/0673; G06F 16/128; G06F 3/0604; G06F 17/30088; G06F 3/067; G06F 2212/604; G06F 2212/652; G06F 2201/85; G06F 2201/84; G06F 11/1446; G06F 11/1471; H04L 67/1097; H04L 67/2809; H04L 67/2842; H04L 69/40

See application file for complete search history.

(56) References Cited

U.S. PATENT DOCUMENTS 5,878,431 A   3/1999 Potterveld et al.
7,849,223 B2   12/2010 Malkhi et al.
(Continued)

*Primary Examiner* — Tasnima Matin

(74) *Attorney, Agent, or Firm* — Mintz Levin Cohn Ferris Glovsky and Popeo, P.C.

(57) ABSTRACT

A method for providing block access on top of a key-value store comprising a distributed data storage system is provided. The method can include receiving, at a block device, a first input/output operation requesting one or more data blocks. The first input/output operation can be translated into a second input/output operation requesting one or more key-value pairs. The second input/output operation can be performed by at least sending the second input/output operation to the key-value store. Related systems and articles of manufacture, including computer program products, are also provided.

18 Claims, 11 Drawing Sheets

(51) Int. Cl.

| | |
|---|---|
| *G06F 16/11* | (2019.01) |
| *H04L 29/14* | (2006.01) |
| *G06F 11/14* | (2006.01) |
| *H04L 29/08* | (2006.01) |
| *G06F 16/2455* | (2019.01) |
| *G06F 12/0802* | (2016.01) |
| *G06F 16/16* | (2019.01) |
| *G06F 16/182* | (2019.01) |
| *G06F 16/176* | (2019.01) |
| *G06F 16/13* | (2019.01) |
| *G06F 12/1009* | (2016.01) |
| *G06F 16/951* | (2019.01) |
| *G06F 16/27* | (2019.01) |
| *G06F 16/23* | (2019.01) |
| *G06F 11/16* | (2006.01) |
| *G06F 16/245* | (2019.01) |
| *G06F 16/215* | (2019.01) |

(52) U.S. Cl.
CPC .......... *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *G06F 17/30088* (2013.01); *H04L 67/1097* (2013.01); *H04L 67/2809* (2013.01); *H04L 67/2842* (2013.01); *H04L 69/40* (2013.01); *G06F 2201/84* (2013.01); *G06F 2201/85* (2013.01); *G06F 2212/604* (2013.01); *G06F 2212/652* (2013.01)

(56) References Cited

U.S. PATENT DOCUMENTS

| | | |
|---|---|---|
| 8,760,460 B1 | 6/2014 | Kilgariff |
| 9,087,020 B1 | 7/2015 | Amacker |
| 10,158,642 B2 | 12/2018 | Jujjuri |
| 10,298,640 B1 | 5/2019 | Luke |
| 2006/0045111 A1 | 3/2006 | Sinha |
| 2006/0271705 A1 | 11/2006 | Garcia-Luna-Aceves |
| 2009/0150566 A1 | 6/2009 | Malkhi et al. |
| 2009/0216936 A1 | 8/2009 | Chu |
| 2009/0287975 A1 | 11/2009 | Kim |
| 2010/0002506 A1 | 1/2010 | Cho |
| 2010/0027351 A1 | 2/2010 | Seol |
| 2010/0293140 A1 | 11/2010 | Nishiyama |
| 2011/0197023 A1 | 8/2011 | Iwamitsu |
| 2012/0246190 A1* | 9/2012 | Surtani ................ G06F 16/27 707/769 |
| 2013/0080348 A1 | 3/2013 | Pantaliano |
| 2013/0275656 A1* | 10/2013 | Talagala ............. G06F 12/0246 711/103 |
| 2013/0275818 A1 | 10/2013 | Okubo |
| 2014/0059290 A1 | 2/2014 | Ross |
| 2014/0215179 A1 | 7/2014 | Matsuhira |
| 2014/0279920 A1 | 9/2014 | Madhavarapu |
| 2014/0289358 A1 | 9/2014 | Lindamood et al. |
| 2014/0304409 A1 | 10/2014 | Kamath |
| 2015/0058291 A1 | 2/2015 | Earl |
| 2015/0089185 A1 | 3/2015 | Brandyberry |
| 2016/0026672 A1 | 1/2016 | Zhang |
| 2016/0105471 A1 | 4/2016 | Nunes et al. |
| 2016/0308968 A1 | 10/2016 | Friedman |
| 2017/0134276 A1 | 5/2017 | White |
| 2017/0295061 A1 | 10/2017 | Wittenschlaeger |
| 2019/0171762 A1 | 6/2019 | Luke |
| 2019/0205993 A1 | 7/2019 | Rodriguez |

* cited by examiner

KEY VALUE BASED BLOCK DEVICE

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to a network block device for providing block access on top of a key-value store.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for providing block access on top of a key-value store. In one aspect, there is provided a system. The system may include at least one data processor and at least one memory. The at least one memory may store instructions that result in operations when executed by the at least one data processor. The operations may include: receiving, at a block device, a first input/output operation requesting one or more data blocks; translating the first input/output operation into a second input/output operation requesting one or more key-value pairs; and performing the second input/output operation by at least sending the second input/output operation to at least one key-value store comprising the distributed data storage system.

In some variations, one or more features disclosed herein including the following features can optionally be included in any feasible combination. The block device can be a network-accessible block device. The at least one key-value store can be hosted on a remote computing node within the distributed data storage system.

In some variations, a size associated with the first input/output operation can be validated. The size of the first input/output operation can be a quantity of data accessed by the first input/output operation. The size of the first input/output operation can be validated based at least on the size of the first input/output being a power of two and being equal to a size of a data block associated with the block device. The size of the data block can be variable.

In some variations, an offset associated with the first input/output operation can be validated. The offset of the first input/output operation can include a starting location of a data block accessed by the first input/output operation. The offset of the first input/output operation can be validated based at least on the offset of the first input/output operation being a multiple of the size of the first input/output operation.

In some variations, the first input/output operation and/or the second input/output operation can include a read operation and/or a write operation accessing the one or more data blocks. The first input/output operation and/or the second input/output operation can include an initialization operation accessing the one or more data blocks to delete data stored in the one or more data blocks.

In some variations, the at least one key-value store can be a hybrid key-value store that includes an in-memory key-value store and a secondary data store. The in-memory key-value store can store at least a first data record including a key associated with the one or more key-value pairs. The secondary data store can store at least a second data record including at least a portion of a value associated with the one or more key-value pairs. The first data record can further include a reference to at least the second data record. The first input/output operation can be translated into the second input/output operation at least by locating, based at least on an index associated with the one or more data blocks, the first data record in the in-memory key-value store and/or the second data record in the secondary data store. The index can correspond to the key associated with the one or more key-value pairs.

In some variations, the block device can be a first object in a topology of the distributed data storage system. The first object can be associated with a second object corresponding to a block on the block device. The second object can be a data structure storing an offset, a size, and/or a data array associated with the block on the block device.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
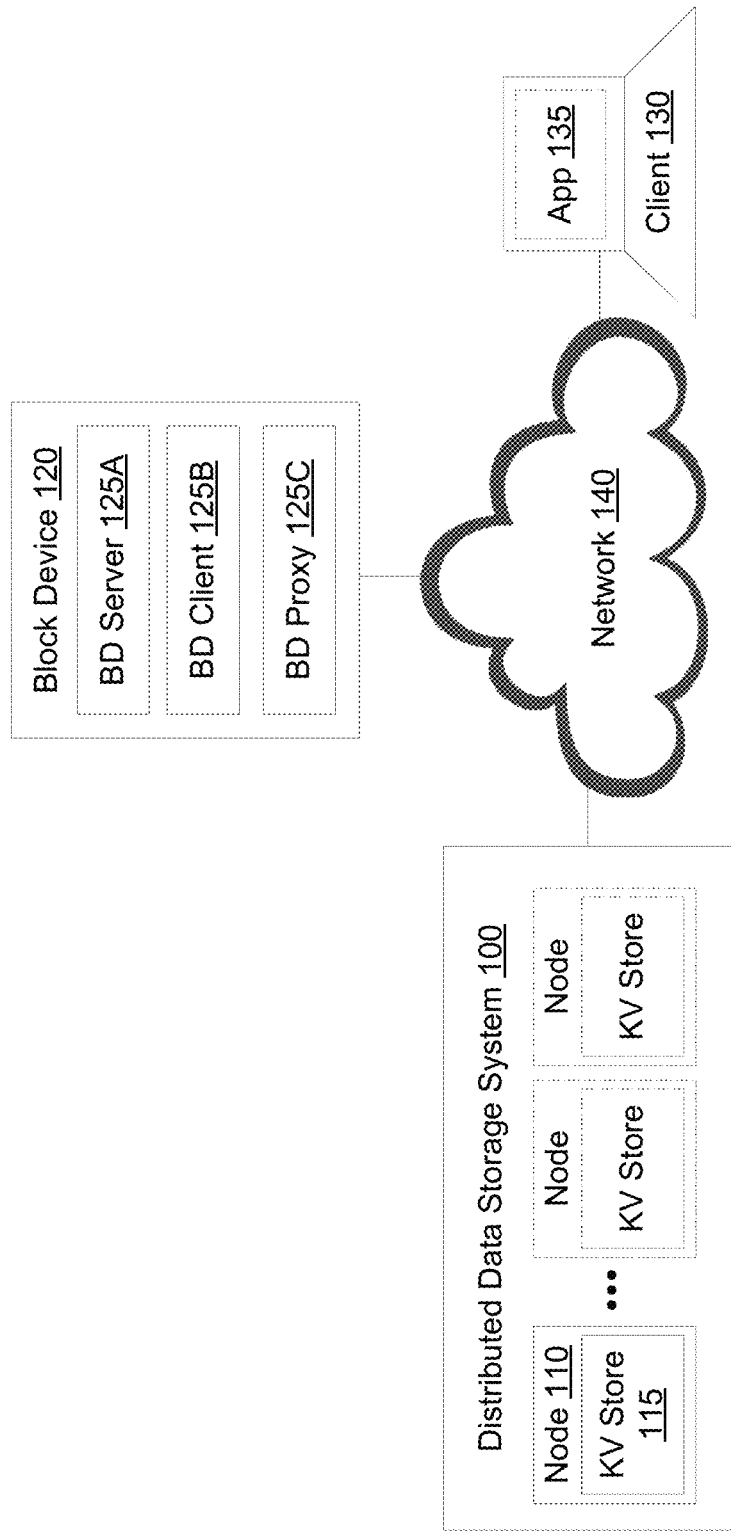
FIG. 1 depicts a system diagram illustrating a distributed data storage system consistent with some implementations of the current subject matter.

A distributed data storage system can include a plurality of computing nodes, each of which storing data in fixed and/or variable sized blocks of memory such as, for example, memory pages and/or the like. Meanwhile, a filesystem can provide an interface for accessing this data. For example, the data can be separated into one or more files and grouped into folders that each include at least one file. These files and/or folders can be organized in accordance to a hierarchy, which can be reflected in a directory associated with the filesystem. The distributed data storage system can respond to an input/output (I/O) operation accessing one or more files in the filesystem by retrieving the corresponding data blocks. However, these data blocks cannot be addressed directly if data in the distributed storage system is stored as key-value pairs (KVPs) in one or more key-value stores. As such, in some implementations of the current subject matter, the distributed data storage system can include a block device configured to translate input/output operations requesting one or more data blocks into input/output operations requesting one or more corresponding key-value pairs in the key-value store. The block device can be network accessible, thereby providing access to key-value pairs stored at various remote locations within the distributed data storage system.

In some implementations of the current subject matter, the distributed data storage system can store key-value pairs in a hybrid key-value store, which can be hosted on one or more of the plurality of computing nodes included in the distributed data storage system. The key associated with a key-value pair can correspond to an index associated with a data block whereas the value associated with the key-value pair can correspond to data included in the data block. As such, translating an input/output operation requesting a data block into an input/output operation requesting a corresponding key-value pair can include identifying the index associated with the data block. The index associated with the data block can further be used as a key to locate the data included in the data block, for example, by at least locating the value of a key-value pair associated with the key.

In some implementations of the current subject matter, storing a key-value pair in the hybrid key-value store can include dividing the key-value pair into a plurality of data records. This plurality of data records can include smaller sized data records (e.g., less than 2 kilobytes) that can be stored in an in-memory key-value store as well as larger sized data records (e.g., greater than 2 kilobytes) that can be stored in a secondary data store. A first data record can include the key associated with the key-value pair which, as noted, can correspond to the index of the data block. Furthermore, the first data record can include at least some of the data from the data block, for example, as a portion of the value associated with the key-value pair. This first data record can be a smaller sized data record held in the in-memory key-value store. Meanwhile, any other data included in the data block can be stored, in at least a second data record, as the remaining portions of the value associated with the key-value pair. This second data record can be a smaller sized data record held in the in-memory key-value store and/or a larger sized data record held in the secondary data store.

In some implementations of the current subject matter, the block device can translate the input/output operation requesting the data block into an input/output operation requesting at least the first data record forming the corresponding key-value pair, which includes the index of the data block as the key of the key-value pair as well as at least some of the data included in the data block as a portion of the value of the key-value pair. The first data record can further include references (e.g., pointers, page list, and/or the like) to at least the second data record holding data from the data block as remaining portions of the value associated with the key-value pair. As such, in the event the input/output operation requires additional data from the data block that is not included in the first data record, the input/output operation requesting the data block can be further translated into an input/output operation requesting, based on the references included in the first data record, at least the second data record from the secondary data store.

FIG. 1 depicts a system diagram illustrating a distributed data storage system 100 consistent with implementations of the current subject matter. Referring to FIG. 1, the distributed data storage system 100 can include a plurality of computing nodes, each of which hosting a key-value store. For example, the distributed data storage system 100 can include a computing node 110, which hosts a key-value store 115. In some implementations of the current subject matter, the key-value stores in the distributed data storage system 100 (e.g., the key-value store 115) can be hybrid key-value stores in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like.

As shown in FIG. 1, the distributed data storage system 100 can be communicatively coupled, via a network 140, with a plurality of clients including, for example, a client 130. The network 140 can be any wired and/or wireless network including, for example, a public land mobile network (PLMN), a local area network (LAN), a virtual local area network (VLAN), a wide area network (WLAN), the Internet, and/or the like. In some implementations of the current subject matter, the client 130 can send, to the distributed data storage system 100 and via an application 135, one or more queries including, for example, structured query language (SQL) statements and/or the like. It should be appreciated that the application 135 can be any type of application providing an interface (e.g., user interface) for interacting with the distributed data storage system 100.

The data required to respond to these queries form the client 130 can be stored in one or more of the plurality of key-value stores including, for example, the key-value store 110. However, the queries from the client 130 can request one or more data blocks instead of key-value pairs. For instance, the client 130 can access a file in a filesystem that operates on the block device 120, which in turn is backed by one or more key-value stores such as, for example, the key value store 115. As such, in some implementations of the current subject matter, the distributed data storage system 100 can include a block device 120 for translating the queries from the client 130. For example, the block device 120 can be configured to translate the requests for data blocks into requests for key-value pairs, which can be executed at one or more of the plurality of key-value stores including, for example, the key-value store 110.

Referring again to FIG. 1, the block device 120 can include a block device server 125A, a block device client 125B, and/or a block device proxy 125C. For local deployment, remote deployment, and/or application-level deployment of the block device 120, the block device server 125A, the block device client 125B, and/or the block device proxy 125C can reside at the distributed data storage system 100, for example, at the computing node 110, and/or at the client 130. To further illustrate, FIGS. 2A-C depicts various deployments of the block device 120 across the distributed data storage system 100 and/or the client 130.

Figure 2A:
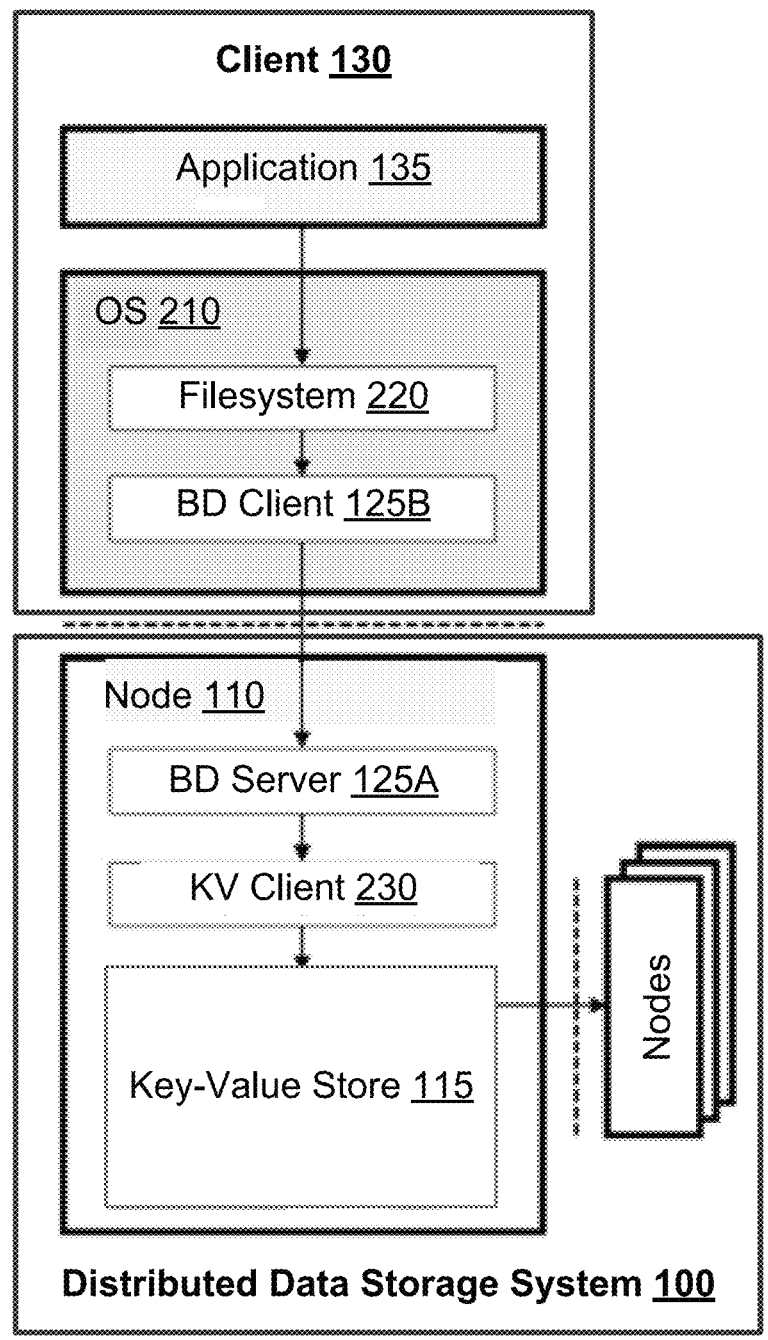
FIG. 2A depicts a block diagram illustrating a remote deployment of a block device consistent with some implementations of the current subject matter.

FIG. 2A depicts a block diagram illustrating a remote deployment of the block device 120 consistent with some implementations of the current subject matter. For instance, as shown in FIG. 2A, the block device server 125A can reside at the distributed data storage system 100, for example, at the computing node 110. Meanwhile, the block device 125B can reside at the client 130, for example, as part of an operating system 210 of the client 130. As FIG. 2A shows, the client 130 can access the distributed data storage system 100, for example, via the application 135. For example, the client 130 can send, via the application 135, an input/output operation that requests one or more data blocks corresponding to files within a filesystem 220 of the operating system 210. The filesystem 220 can interface with the block device client 125, which can be communicatively coupled with the block device server 125A residing at the distributed data storage system 100. Accordingly, the filesystem 220 can forward the input/output operation to the block device client 125B, which can be configured to route the input/output operation onto the block device server 125A.

In some implementations of the current subject matter, the block device server 125A can translate the input/output operation, which requests one or more data blocks, into another input/output operation requesting one or more key-values pairs. Furthermore, the input/output operation requesting one or more key-value pairs can be forwarded to the key-value client 230. The key-value client 230 can perform the input/output operation by at least retrieving the requested key-value pairs. These key-value pairs can be stored in the key-value store 115 at the computing node 110, for example, as one or more data records in an in-memory key-value store and/or a secondary data store. Alternatively and/or additionally, these key-value pairs can be stored at other key-value stores hosted by other remote computing nodes within the distributed data storage system 100. Here, the block device 120 can act as a network block device (NBD), which enables the retrieval of key-value pairs stored at remote locations (e.g., other key-value stores hosted by other computing nodes) within the distributed data storage system 100.

Figure 2B:
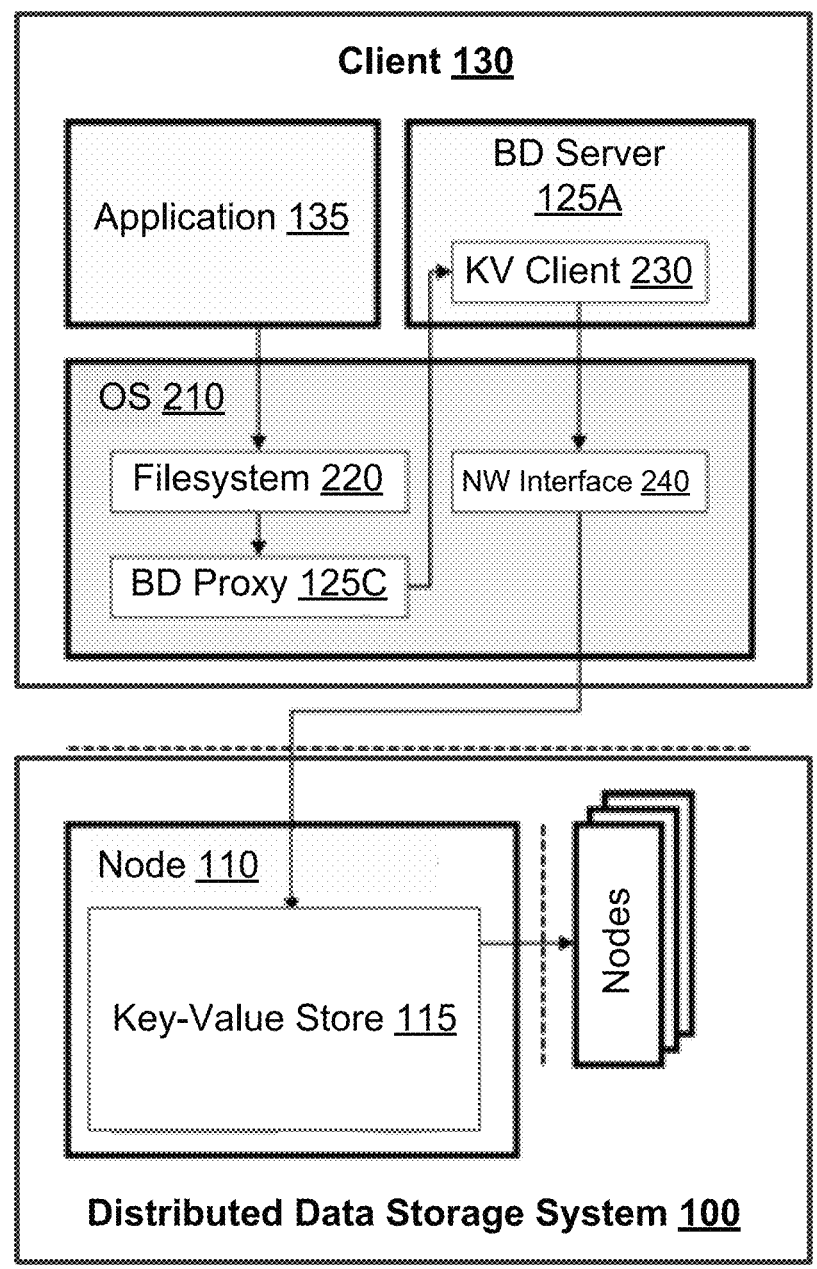
FIG. 2B depicts a block diagram illustrating a local deployment of a block device consistent with some implementations of the current subject matter.
Figure 2C:
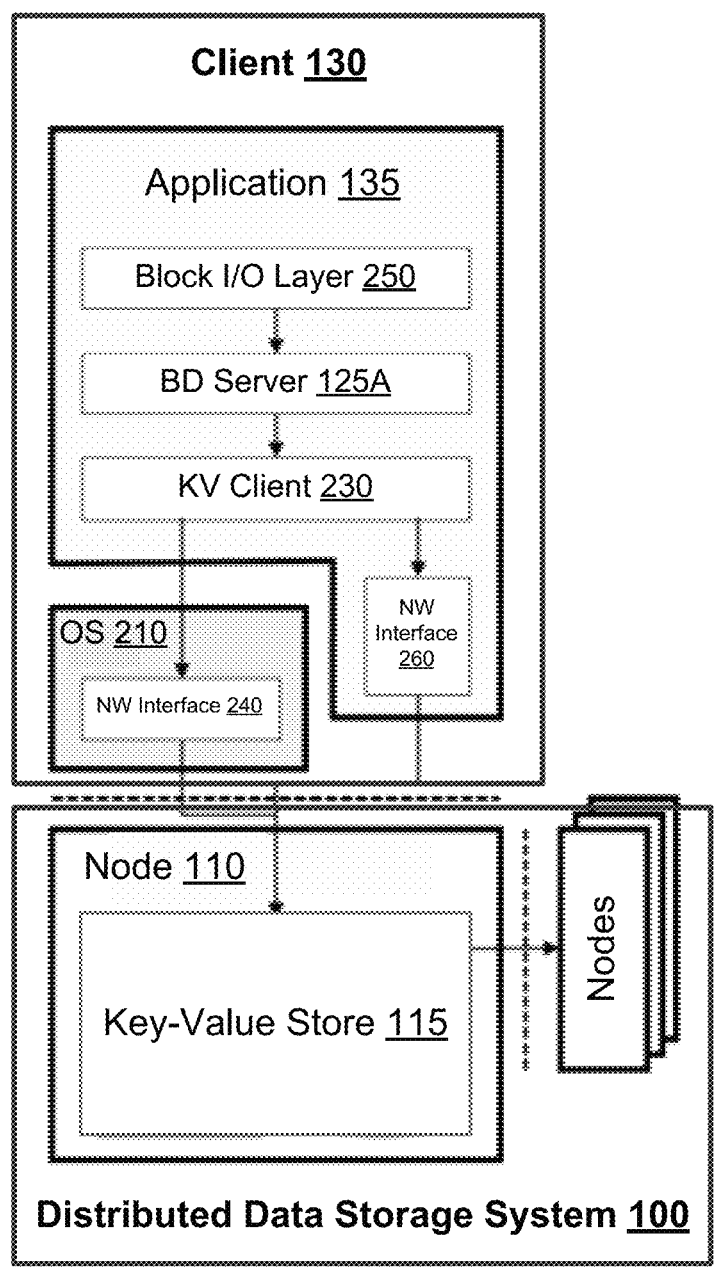
FIG. 2C depicts a block diagram illustrating an application level deployment of a block device consistent with some implementations of the current subject matter.

FIG. 2B depicts a block diagram illustrating a local deployment of the block device 120 consistent with some implementations of the current subject matter. Referring to FIG. 2B, the block device 120 can reside fully at the client 130. For instance, as FIG. 2B shows, the block device server 125A can reside at the client 130 and can include the key-value client 230. Furthermore, the block device proxy 125C can also reside at the client 130, for example, as part of the operating system 210.

In some implementations of the current subject matter, the client 130 can access the distributed data storage system 100, for example, via the application 135. As shown in FIG. 2B, the client 130 can send, via the application 135, an input/output operation that requests one or more data blocks corresponding to files within the filesystem 220 of the operating system 210. The filesystem 220 can interface ith the block device proxy 125C, which can be communicatively coupled with the block device server 125A residing at the client 130. For instance, the block device proxy 125C can route the input/output operation to the block device server 125A, which can be configured to translate the input/output operation, which requests one or more data blocks, into another input/output operation requesting one or more key-values pairs. Furthermore, the key-value client 230 can perform the input/output operation requesting the one or more key-value pairs, for example, by at least retrieving these key-value pairs from the distributed data storage system 100.

In some implementations of the current subject matter, the key-value client 230 can perform the input/output operation requesting the one or more key-value pairs remotely. That is, the key-value client 230 can retrieve these key-value pairs, via a network interface 240, from one or more of the plurality of computing nodes at the distributed data storage system 100. At least some of these key-value pairs can be stored at the computing node 110, for example, in the key-value store 115. Alternatively and/or additionally, some of these key-value pairs can be stored at other key-value stores hosted by other remote computing nodes within the distributed data storage system 100. As such, the block device 120 can act as a network block device (NBD) by at least enabling the retrieval key-value pairs from at least one remote location within the distributed data storage system 100.

FIG. 2C depicts a block diagram illustrating an application level deployment of the block device 120 consistent with some implementations of the current subject matter. Referring to FIG. 2C, the block device can reside fully at the client 130, for example, as an integrated part of the application 135. As noted, the application 135 can be any type of application providing an interface (e.g., user interface) for interacting with the distributed data storage system 100. For instance, the client 130 can send, via the application 135, an input/output operation requesting one or more data blocks. Accordingly, as shown in FIG. 2C, the application 135 can include a block input/output layer 250, which can be configured to receive the input/output operation requesting the one or more data blocks.

In some implementations of the current subject matter, the application 135 can include the block device server 125A and the key-value client 230. The block device server 125A can be configured to translate the input/output operation requesting the one or more data blocks into another input/output operation requesting one or more key-value pairs. Meanwhile, the key-value client 230 can perform the input/output operation requesting the one or more key-value pairs remotely, for example, by at least retrieving these key-value pairs via the network interface 240 included in the operating system 210 and/or another network interface 260 native to the application 135. It should be appreciated that at least some of these key-value pairs can be stored at the computing node 110, for example, in the key-value store 115. Alternatively and/or additionally, some of these key-value pairs can be stored at other key-value stores hosted by other remote computing nodes within the distributed data storage system 100. As such, the block device 120 can act as a network block device (NBD) by at least enabling the retrieval key-value pairs from at least one remote location within the distributed data storage system 100.

Figure 2D:
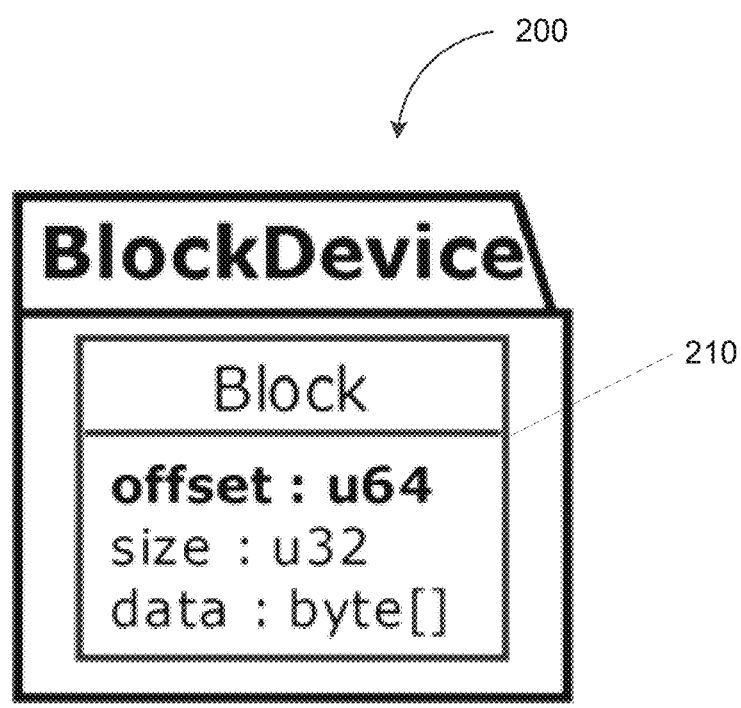
FIG. 2D depicts a structure of an object stored in key-value store corresponding to a block on a block device consistent with some implementations of the current subject matter.

In some implementations of the current subject matter, the block device 120 can be one of the objects forming a topology of the distributed data storage system 100. For example, the topology of the distributed data storage system 100 can include objects corresponding to, for example, tenants, data containers, data partitions, data centers, availability zones, racks, computing nodes, block devices, and/or the like. To further illustrate, FIG. 2D depicts an first object 200 corresponding to the block device 120 and a second object 210 corresponding to a single block on the block device 120 consistent with some implementations of the current subject matter. As shown in FIG. 2D, the second object 210 corresponding to the block on the block device 120 can be a data structure that includes an offset, a size, and a data array (e.g., byte[ ]) of each data block associated with the block device 120. It should be appreciated that the block device 120 can be associated with different sized data blocks, for example, in the case of a client application that uses different page sizes for different extents within a database.

Where the block device 120 is deployed remotely, for example, at the computing node 110, the topology of the distributed data storage system 100 can include an instance of the first object 200 corresponding to the block device 120. The instance of object 200 containing instances of the second object 210, each of which corresponding to a block on the block device 120, can be linked to another object corresponding to the computing node 110. Meanwhile, the object corresponding to the computing node 110 can be linked to an object corresponding to a rack holding the computing node 110, an object corresponding to an availability zone including the computing node 110, and/or an object corresponding to a data center in which the computing node 110 resides. As such, the object 200 corresponding to the block device 120 can be located by at least traversing the topology of the distributed data storage system 100.

Figure 3:
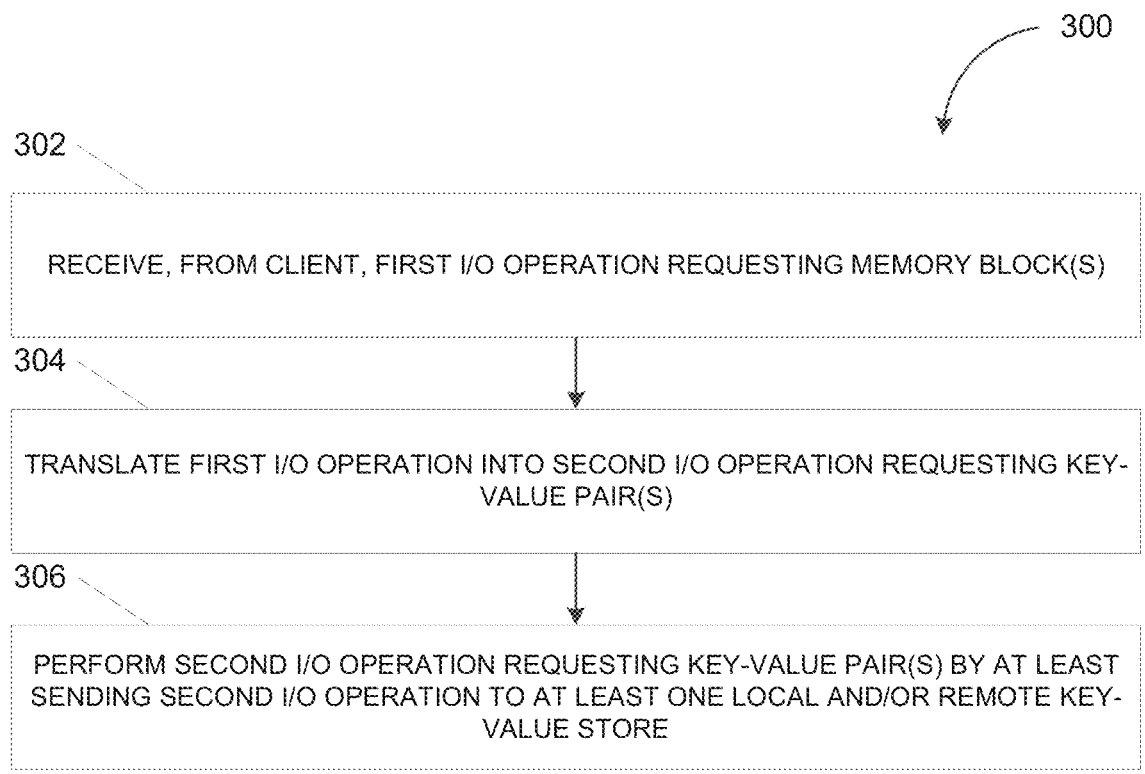
FIG. 3 depicts a flowchart illustrating a process for performing an input/output operation in a key-value store consistent with some implementations of the current subject matter.

FIG. 3 depicts a flowchart illustrating a process 300 for performing an input/output operation in a key-value store consistent with implementations of the current subject matter. Referring to FIGS. 1, 2A-D, and 3, the process 300 can be performed by the block device 120.

The block device 120 can receive, from a client, a first input/output operation requesting one or more data blocks (302). For example, the block device 120 can receive, from the client 130, an input/output operation requesting one or more data blocks, which can correspond to files within the filesystem 220. However, data in the distributed data storage system 100 can include key-value stores such as, for example, the key-value store 115, which are configured to store data in the form of key-value pairs. As such, the input/output operation from the client 130 requesting one or more data blocks cannot be performed directly by the distributed data storage system 100. Instead, the block device 120 can provide access to the data (e.g., the key-value pairs) stored at the distributed data storage system 100.

The block device 120 can translate the first input/output operation into a second input/output operation requesting one or more key-value pairs (304). In some implementations of the current subject matter, an index associated with a data block can correspond to the key in a key-value pair whereas the data included in the data block can correspond to the value in the key-value pair. Accordingly, translating an input/output operation requesting a data block into an input/output operation requesting a corresponding key-value pair can include identifying the index associated with the data block. The index associated with the data block can be used as a key to locate the data included in the data block, for example, by at least locating the value of a key-value pair associated with the key.

In some implementations of the current subject matter, the distributed data storage system 100 can store key-value pairs in hybrid key-value stores. Storing a key-value pair in a hybrid key-value store can require dividing the key-value pair into a plurality of data records. This plurality of data records can include smaller sized data records (e.g., less than 2 kilobytes) that can be stored in an in-memory key-value store as well as larger sized data records (e.g., greater than 2 kilobytes) that can be stored in a secondary data store. The key associated with the key-value pair as well as a portion of the value associated with the key-value pair can be part of a first data record, which can be a smaller sized data record held in the in-memory key-value store. Meanwhile, any remaining portions of the value associated with the key-value pair can be part of at least a second data record, which can be a smaller sized data record held in the in-memory key-value store and/or a larger sized data record held in the secondary data store. Accordingly, in some implementations of the current subject matter, the block device 120 can translate the input/output operation requesting the data block into an input/output operation requesting the first data record and/or the second data record. The first data record can include the index of the data block as the key of the corresponding key-value pair and at least some of the data included in the data block as a portion of the value associated with the key-value pair. Alternatively and/or additionally, the second data record can include data included in the data block as at least some of the remaining portions of the value associated with the key-value pair.

The block device 120 can perform the second input/output operation requesting the one or more key-value pairs by at least sending the second input/output operation to at least one key-value store that is local and/or remote to the block device 120 (306). For example, in some implementations of the current subject matter, the distributed data storage system 100 can support input/output operations that accesses one or more key-value pairs stored at key-value stores hosted by different computing nodes (e.g., the key-value store 115 at the computing node 110) across the distributed data storage system 100. According, upon translating the input/output operation requesting the one or more data blocks into a different input/output operation requesting the one or more key-value pairs, the block device 120 can send the input/output operation to the distributed data storage system 100, for example, to the computing node 100 hosting the key-value store 110. That input/output operation can be performed at the computing node 100 by at least retrieving the corresponding data records from the key-value store 110, for example, from an in-memory key-value store and/or a secondary data store at the key-value store 110.

Figure 4A:
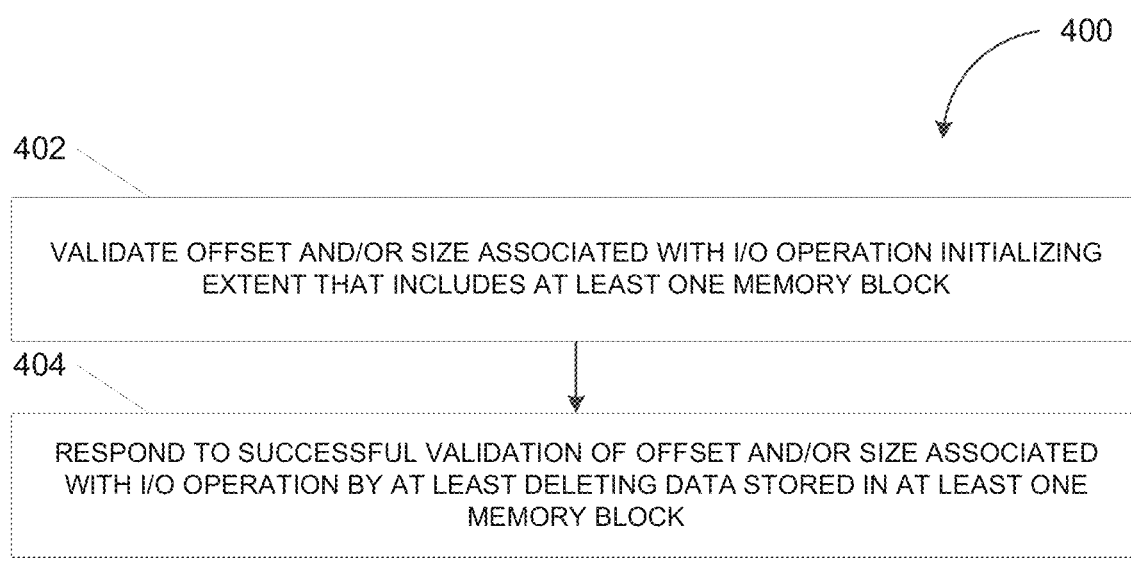
FIG. 4A depicts a flowchart illustrating a process for initializing an extent in a key-value store consistent with some implementations of the current subject matter.

FIG. 4A depicts a flowchart illustrating a process 400 for performing an initialization operation accessing a key-value store consistent with some implementations of the current subject matter. Referring to FIGS. 1, 2A-D, 3, and 4A, the process 400 can be performed by the block device 120, for example, to implement operation 306 of the process 300. It should be appreciated that the process 400 can be performed in order to generate one or more free data blocks, which can be used for a subsequent input/output operation such as, for example, a write operation and/or the like. As used herein, an extent can refer to a contiguous group of data blocks.

The block device 120 can validate an offset and/or a size associated with an input/output operation initializing an extent that includes at least one data block (402). For example, the input/output operation can be associated with an offset corresponding to a starting location of a data block accessed by the input/output operation. Furthermore, the input/output operation can be associated with a size corresponding to a quantity of data accessed by the input/output operation. In some implementations of the current subject matter, the block device 120 can validate whether the offset and/or the size associated with the input/output operation correctly addresses one or more data blocks.

The block device 120 can respond to a successful validation of the offset and/or the size associated with the input/output operation by at least deleting data stored in the at least one data block (404). In some implementations of the current subject matter, upon successfully validating the offset and/or the size associated with the input/output operation, the block device 120 can initialize an extent that includes at least one data block by at least deleting data stored in the at least one data block. For example, the data stored in the extent can be initialized by at least deleting a range of keys corresponding to a range of indices of data blocks within the extent. Erasing the data stored in an extent can enable that extent to be reused for subsequent input/output operations including, for example, a write operation with a same and/or different block size than before.

Figure 4B:
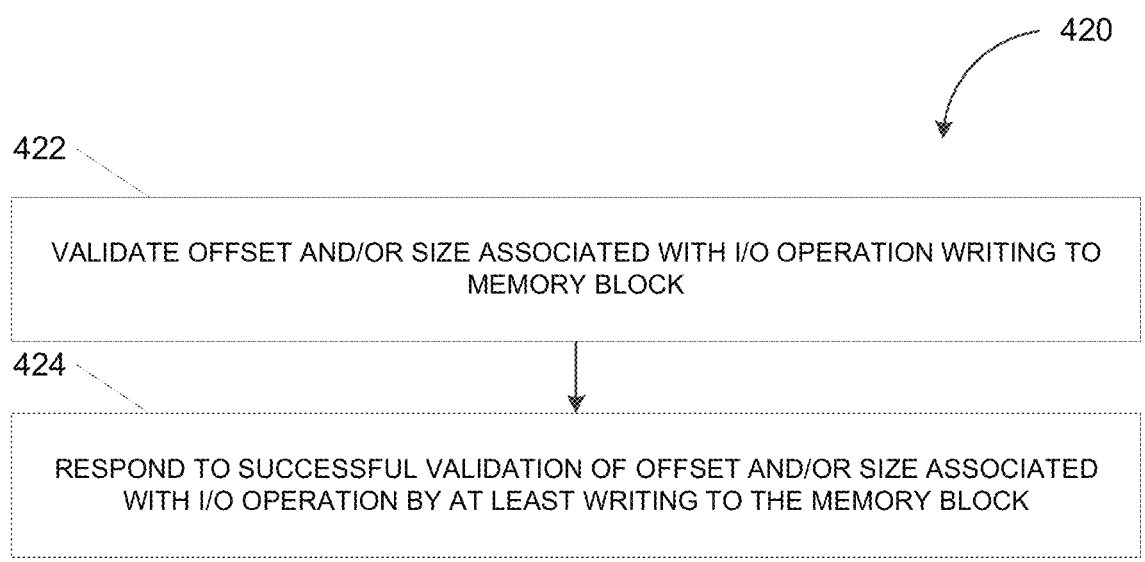
FIG. 4B depicts a flowchart illustrating a process for performing a write operation accessing a key-value store consistent with some implementations of the current subject matter.

FIG. 4B depicts a flowchart illustrating a process 420 for performing a write operation accessing a key-value store consistent with some implementations of the current subject matter. Referring to FIGS. 1, 2A-D, 3, and 4B, the process 420 can be performed by the block device 120, for example, to implement operation 306 of the process 300. It should be appreciated that the process 420 can be performed in order to write to a data block.

The block device 120 can validate an offset and/or a size associated with an input/output operation writing to a data block (422). For example, the input/output operation can be associated with an offset corresponding to a starting location of a data block accessed by the input/output operation. Furthermore, the input/output operation can be associated with a size corresponding to a quantity of data accessed by the input/output operation. In some implementations of the current subject matter, the block device 120 can validate whether the offset and/or the size associated with the input/output operation correctly addresses one or more data blocks.

The block device 120 can respond to a successful validation of the offset and/or the size associated with the input/output operation by at least writing to the data block (424). In some implementations of the current subject matter, upon successfully validating the offset and/or the size associated with the input/output operation, the block device 120 can perform the input/output operation, for example, by at least writing to the data block.

Figure 4C:
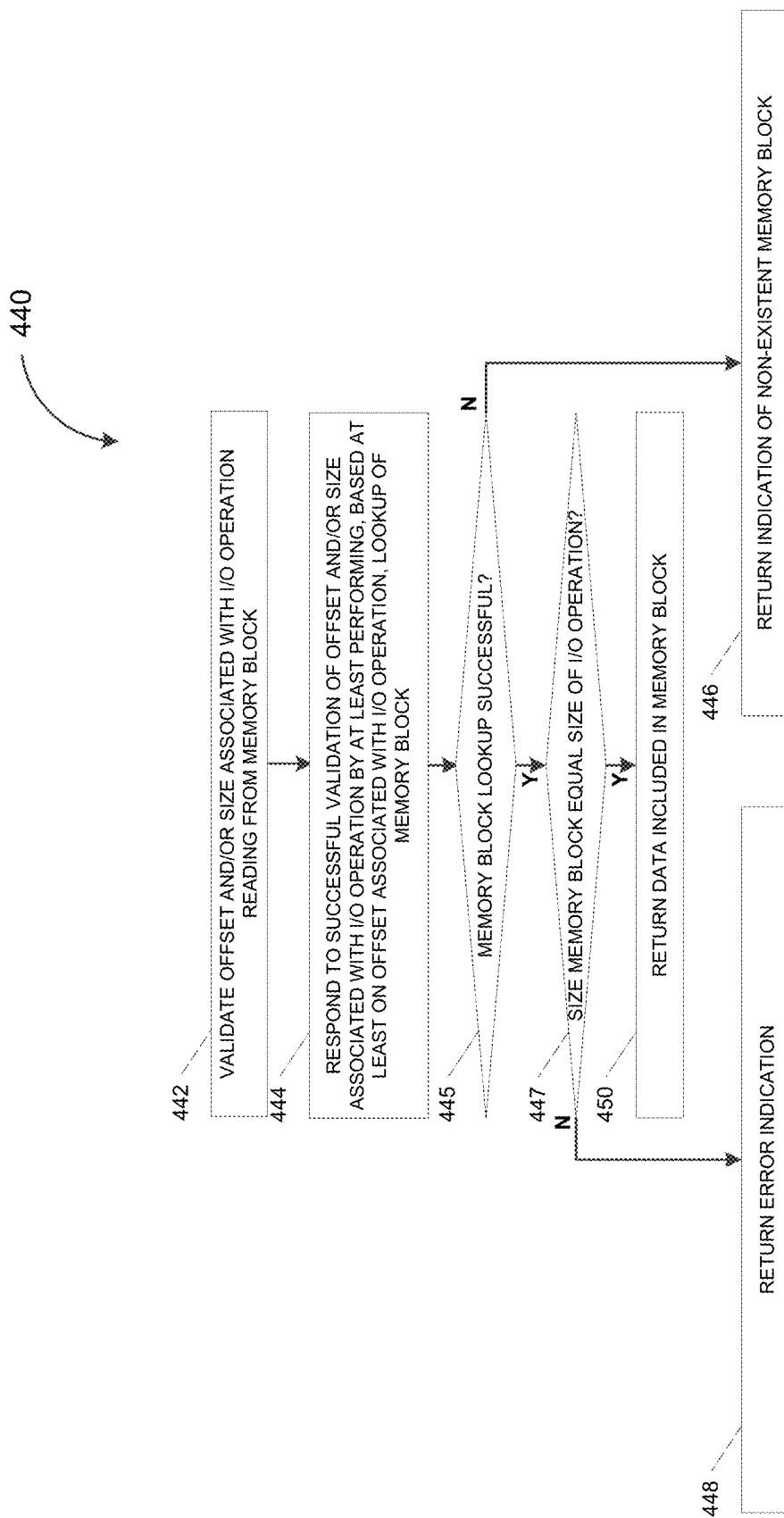
FIG. 4C depicts a flowchart illustrating a process for performing a read operation accessing a key-value store consistent with some implementations of the current subject matter.

FIG. 4C depicts a flowchart illustrating a process 440 for performing a read operation accessing a key-value store consistent with some implementations of the current subject matter. Referring to FIGS. 1, 2A-D, 3, and 4C, the process 440 can be performed by the block device 120, for example, to implement operation 306 of the process 300. It should be appreciated that the process 420 can be performed in order to read from a data block.

The block device 120 can validate an offset and/or a size associated with an input/output operation reading from a data block (442). For example, the input/output operation can be associated with an offset corresponding to a starting location of a data block accessed by the input/output operation. Furthermore, the input/output operation can be associated with a size corresponding to a quantity of data accessed by the input/output operation. In some implementations of the current subject matter, the block device 120 can validate whether the offset and/or the size associated with the input/output operation correctly addresses one or more data blocks.

The block device 120 can respond to a successful validation of the offset and/or the size associated with the input/output operation by at least performing, based at least on the offset associated with the input/output operation, a lookup of the data block (444). In some implementations of the current subject matter, upon successfully validating the offset and/or the size associated with the input/output operation, the block device 120 can perform the input/output operation by at least locating the data block indicated by the input/output operation. For example, the block device 120 can locate the data block based at least on the offset associated with the input/output operation. As noted, the offset associated with the input/output operation can correspond to a starting location of a data block.

The block device 120 can determine whether the lookup of the data block was successfully performed (445). If the block device 120 determines that the lookup of the data block was unsuccessful (445-N), the block device 120 can return an indication that the data block is non-existent (446). For example, in some implementations of the current subject matter, the block device 120 can return an indication that the data block at the offset indicated by the input/output operation does not exist if the block device 120 is unable to locate a data block at the offset indicated by the input/output operation.

Alternatively and/or additionally, if the block device 120 determines that the lookup of the data block was successful (445-Y), the block device 120 can determine whether a size of the data block is equal to the size associated with the input/output operation reading from the data block (447). If the block device 120 determines that the size of the data block is not equal to the size associated with the input/output operation reading from the data block (447-N), the block device 120 can return an error indication (448). For instance, in some implementations of the current subject matter, read operations can be performed one data block at a time. Accordingly, the input/output operation may be attempting to read a less and/or a greater quantity of data than what is included in the data block if the size associated with the input/output operation does not equal to the size of the data block at the offset indicated by the input/output operation. When that is the case, the block device 120 can return an error indication.

Alternatively and/or additionally, if the block device 120 determines that the size of the data block is equal to the size associated with the input/output operation reading from the data block (447-Y), the block device 120 can return the data included in the data block (450). For example, if the size associated with the input/output operation is equal to the size of the data block at the offset indicated by the input/output operation, then the input/output operation is attempting to read all of the data included in that data block. Accordingly, the block device 120 can return the data that is included in the data block at the offset indicated by the input/output operation.

Figure 4D:
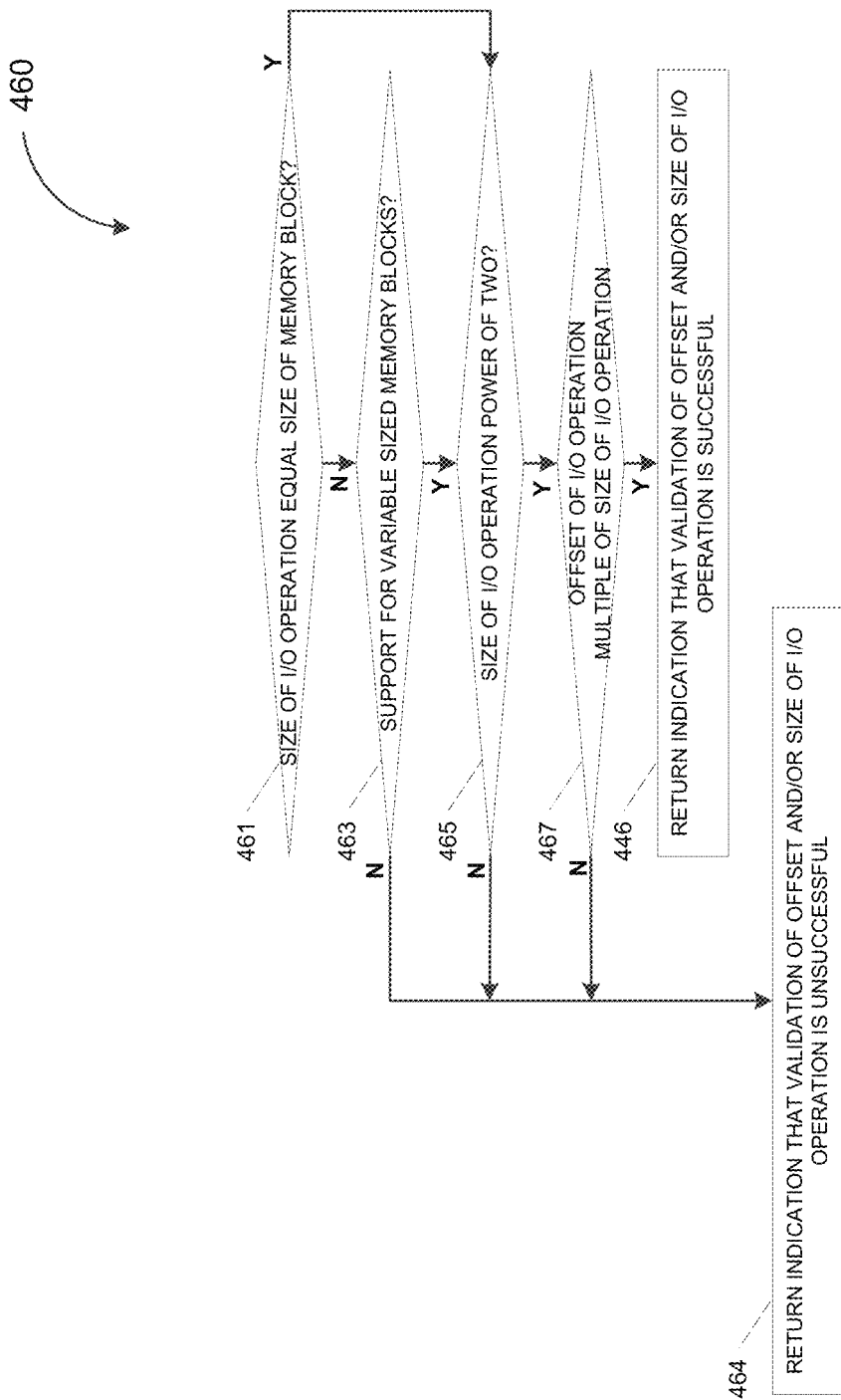
FIG. 4D depicts a flowchart illustrating a process for validating an offset and/or a size associated with an input/output operation consistent with some implementations of the current subject matter.

FIG. 4D depicts a flowchart illustrating a process 460 for validating an offset and/or a size associated with an input/output operation consistent with some implementations of the current subject matter. Referring to FIGS. 1, 2A-D, 3, and 4A-D, the process 460 can be performed by the block device 120, for example, to implement operation 402 of the process 400, operation 422 of the process 420, and/or operation 442 of the process 440. It should be appreciated that the process 420 can be performed in order to determine whether a size and/or an offset associated with an input/output operation (e.g., read, write, initialize, and/or the like) matches those supported by the distributed data storage system 100.

The block device 120 can determine whether a size of an input/output operation equals a size of data blocks associated with the block device 120 (461). As noted, the block device 120 can be associated with an object 200 that includes the offset and the size of the data blocks associated with the block device 120. Accordingly, in some implementations of the current subject matter, the block device 120 can determine whether the size of the input/output operation, which can correspond to a quantity of data being accessed by the input/output operation, is equal to the size of the data block associated with the block device 120

If the block device 120 determines that the size of the input/output operation does not equal the size of the data block associated with the block device 120 (461-N), the block device 120 can determine whether the distributed data storage system 100 supports variable sized data blocks (463). If the block device 120 determines that the distributed data storage system 100 does not support variable sized data blocks (463), the block device 120 can return an error indication (464). For example, in some implementations of the current subject matter, the size of the input/output operation can deviate from the size of the data blocks associated with the block device 120 if the distributed data storage system 100 supports different sized data blocks. However, if the block device 120 determines that the distributed data storage system 100 does not support different sized data blocks, the block device 120 can return an error indication in the event the size of the input/output operation does not equal to the size of the data block associated with the block device 120.

The block device 120 can determine that the size of the input/output operation does equal to the size of the data block associated with the block device 120 (461-Y). Alternatively and/or additionally, the block device 120 can determine that the distributed data storage system 100 does support variable sized data blocks (463-Y). In either instances, the process 460 can resume at operation 465. Here, the block device 120 can determine whether the size of the input/output operation is a power of two (465). If the block device 120 determines that the size of the input/output operation is not a power of two (465-N), the block device 120 can return an error indication (464).

Alternatively and/or additionally, if the block device 120 determines that the size of the input/output operation is a power of two, the block device 120 can determine whether the offset of the input/output operation is a multiple of the size of the input/output operation (467). For example, the block device 120 can determine whether the offset of the input/output operation is a multiple of the size of the input/output operation based at least on a modulus of the offset of the input/output operation and the size of the input/output operation. The offset of the input/output operation can be determined to be a multiple of the size of the input/output operation if the modulus is equal to zero.

If the block device 120 determines that the offset of the input/output operation is not a multiple of the size of the input/output operation (467-N), the block device 120 can return an error indication (464). If the block device 120 determines that the offset of the input/output operation is a multiple of the size of the input/output operation (467-Y), the block device 120 can return an indication that the validation of the offset and/or the size of the input/output operation is successful (468).

Figure 5:
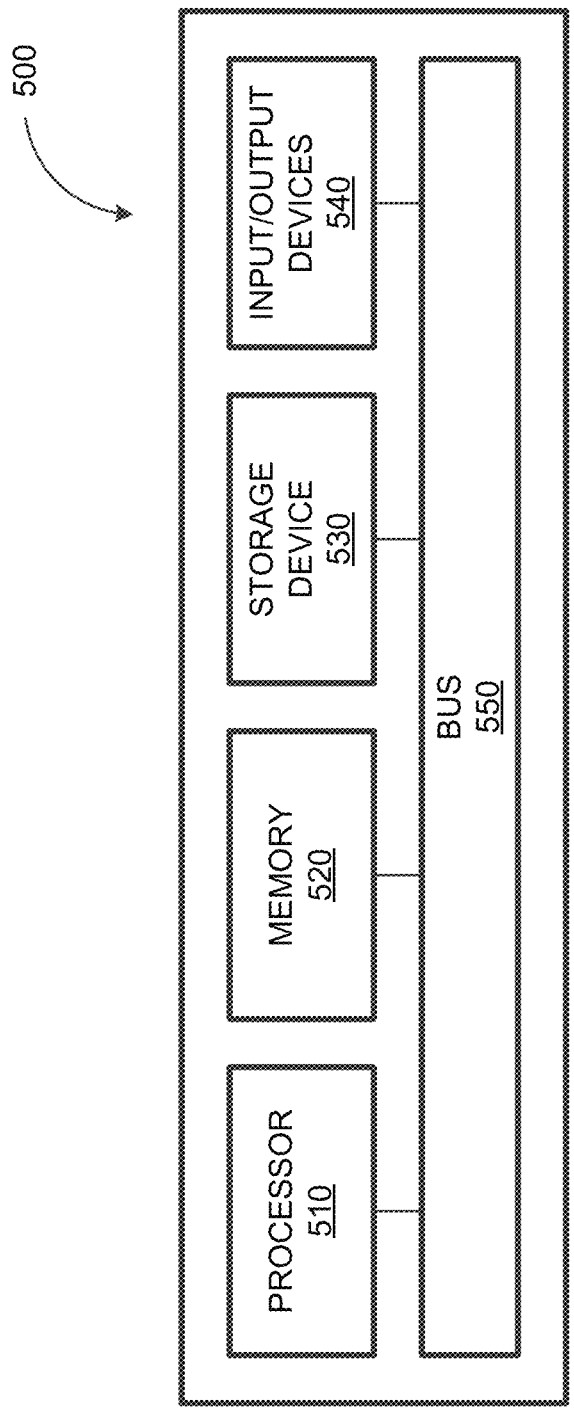
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed data storage system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
   at least one data processor; and
   at least one memory storing instructions which, when executed by the at least one data processor, cause operations comprising:
   receiving, at a block device, a first input/output operation requesting one or more data blocks;
   validating an offset of the first input/output operation, the offset indicating a starting location of a data block of the one or more data blocks accessed by the first input/output operation, the offset being validated based at least on the offset being a multiple of a size of the first input/output operation;
   translating the first input/output operation into a second input/output operation requesting one or more key-value pairs; and
   performing the second input/output operation by at least sending the second input/output operation to at least one key-value store comprising the distributed data storage system.

2. The system of claim 1, wherein the block device comprises a network-accessible block device, and wherein the at least one key-value store is hosted on a remote computing node comprising the distributed data storage system.

3. The system of claim 1, further comprising:
   validating the size of the first input/output operation, the size of the first input/output operation comprising a quantity of data accessed by the first input/output operation, and the size of the first input/output operation being validated based at least on the size of the first input/output operation being a power of two and being equal to the size of the data block associated with the block device, the size of the data block being variable.

4. The system of claim 1, wherein the first input/output operation and/or the second input/output operation comprise a read operation and/or a write operation accessing the one or more data blocks.

5. The system of claim 1, wherein the first input/output operation and/or the second input/output operation comprise an initialization operation accessing the one or more data blocks, and wherein the initialization operation deletes data stored in the one or more data blocks.

6. The system of claim 1, wherein the at least one key-value store comprise a hybrid key-value store including an in-memory key-value store and a secondary data store, wherein the in-memory key-value store stores at least a first data record including a key associated with the one or more key-value pairs, wherein the secondary data store stores at least a second data record including at least a portion of a value associated with the one or more key-value pairs, and wherein the first data record further includes a reference to at least the second data record.

7. The system of claim 6, wherein the first input/output operation is translated into the second input/output operation at least by locating, based at least on an index associated with the one or more data blocks, the first data record in the in-memory key-value store and/or the second data record in the secondary data store, and wherein the index corresponds to the key associated with the one or more key-value pairs.

8. The system of claim 1, wherein the block device comprises a first object in a topology of the distributed data storage system.

9. The system of claim 8, wherein the first object is associated with a second object corresponding to a block on the block device, wherein the second object comprises a data structure storing an offset, a size, and/or a data array associated with the block on the block device.

10. A computer-implemented method, comprising:
    receiving, at a block device, a first input/output operation requesting one or more data blocks;
    validating an offset of the first input/output operation, the offset indicating a starting location of a data block of the one or more data blocks accessed by the first input/output operation, the offset being validated based at least on the offset being a multiple of a size of the first input/output operation;
    translating the first input/output operation into a second input/output operation requesting one or more key-value pairs; and
    performing the second input/output operation by at least sending the second input/output operation to at least one key-value store comprising a distributed data storage system.

11. The method of claim 10, wherein the block device comprises a network-accessible block device, and wherein the at least one key-value store is hosted on a remote computing node comprising the distributed data storage system.

12. The method of claim 10, further comprising:
    validating the size of the first input/output operation, the size of the first input/output operation comprising a quantity of data accessed by the first input/output operation, and the size of the first input/output operation being validated based at least on the size of the first input/output operation being a power of two and being equal to the size of the data block associated with the block device, the size of the data block being variable.

13. The method of claim 10, wherein the first input/output operation and/or the second input/output operation comprise a read operation and/or a write operation accessing the one or more data blocks.

14. The method of claim 10, wherein the first input/output operation and/or the second input/output operation comprise an initialization operation accessing the one or more data blocks, and wherein the initialization operation deletes data stored in the one or more data blocks.

15. The method of claim 10, wherein the at least one key-value store comprise a hybrid key-value store including an in-memory key-value store and a secondary data store, wherein the in-memory key-value store stores at least a first data record including a key associated with the one or more key-value pairs, wherein the secondary data store stores at least a second data record including at least a portion of a value associated with the one or more key-value pairs, and wherein the first data record further includes a reference to at least the second data record.

16. The method of claim 15, wherein the first input/output operation is translated into the second input/output operation at least by locating, based at least on an index associated with the one or more data blocks, the first data record in the in-memory key-value store and/or the second data record in the secondary data store, and wherein the index corresponds to the key associated with the one or more key-value pairs.

17. The method of claim 10, wherein the block device comprises a first object in a topology of the distributed data storage system, wherein the first object is associated with a second object corresponding to a block on the block device, and wherein the second object comprises a data structure storing an offset, a size, and/or a data array associated with the block on the block device.

18. A non-transitory computer-readable medium storing instructions, which when executed by at least one data processor, result in operations comprising:

receiving, at a block device, a first input/output operation requesting one or more data blocks;

validating an offset of the first input/output operation, the offset indicating a starting location of a data block of the one or more data blocks accessed by the first input/output operation, the offset being validated based at least on the offset being a multiple of a size of the first input/output operation;

translating the first input/output operation into a second input/output operation requesting one or more key-value pairs; and performing the second input/output operation by at least sending the second input/output operation to at least one key-value store comprising a distributed data storage system.

\* \* \* \* \*